United States Patent
Manabe et al.

[11] Patent Number: 5,149,127
[45] Date of Patent: Sep. 22, 1992

[54] AIR BAG STRUCTURE FOR AN AUTOMOTIVE VEHICLE

[75] Inventors: Toshiyuki Manabe; Yasunori Iwamoto; Masafumi Sakakida, all of Hiroshima; Hisao Muramoto, Yamaguchi; Haruhiro Inada; Masahiro Matsunaga, both of Hiroshima, all of Japan

[73] Assignee: Mazda Motor Corporation, Shinchi, Japan

[21] Appl. No.: 641,333

[22] Filed: Jan. 15, 1991

Related U.S. Application Data

[63] Continuation-in-part of Ser. No. 470,613, Jan. 29, 1990, abandoned.

[30] Foreign Application Priority Data

Jan. 31, 1989 [JP] Japan ............................. 1-010002[U]
Jul. 23, 1990 [JP] Japan ................................. 2-078557

[51] Int. Cl.5 ............................................. B60R 21/16
[52] U.S. Cl. ................................. 280/731; 280/732; 280/743; 439/373
[58] Field of Search ............... 280/731, 732, 743, 728; 439/368, 369, 373

[56] References Cited

U.S. PATENT DOCUMENTS

| | | | |
|---|---|---|---|
| 2,913,791 | 11/1959 | Martin | 439/369 |
| 3,525,536 | 8/1970 | Pruneski | 280/731 |
| 3,848,695 | 11/1974 | Lacaze, Jr. | 280/735 |
| 4,938,504 | 7/1990 | Fukuda et al. | 280/731 |

FOREIGN PATENT DOCUMENTS 63-111353 7/1988 Japan .
63-184546 7/1988 Japan .

Primary Examiner—Kenneth R. Rice
Attorney, Agent, or Firm—Fish & Richardson

[57] ABSTRACT

An apparatus and method for installing an air bag module for an air bag system equipped in an automotive vehicle for preventing injuries to passengers in a passenger compartment of the automotive vehicle. The system includes an air bag module located to face a passenger in the passenger compartment, a controller mounted to the body of the automotive vehicle for controlling the air bag module and an electrical harness wire for transmitting signals for controlling the module. This harness wire is connected at one end to the air bag module and at the other end to the controller. A flexible temporary holding band for connecting the air bag module is detachably mounted on a hook provided in the passenger compartment. The length of the temporary holding band is determined to be short enough so that the harness wire is still loose even when the temporary holding band is put under strain.

22 Claims, 8 Drawing Sheets

5,149,127

AIR BAG STRUCTURE FOR AN AUTOMOTIVE VEHICLE

This application is a continuation-in-part of U.S. application Ser. No. 07/470,613, filed Jan. 29, 1990, now abandoned.

BACKGROUND OF THE INVENTION

Electronically controlled air bag systems for automotive vehicles are generally known in the prior art. Conventional electronically controlled air bag systems typically comprise a collision sensor attached to the vehicle body, an ignition device which receives an output signal from the collision sensor and an inflator which is ignited by the ignition device and which provides a sufficient amount of gas in a short amount of time to expand an air bag. The air bag is usually mounted on the steering wheel so as to prevent the driver of the automobile from sustaining injuries in the event of a collision.

In conventional air bag systems, main components including the air bag, the inflator and the ignition device are assembled together in a module, and are installed on the steering wheel as a unit. To install the air bag module, it is necessary to connect one or more electrical harnesses between the module and the steering wheel before bolting the module to the steering wheel. Such a system is shown, for example, in Japanese Laid Open Patent Application No. 63-184546.

SUMMARY OF THE INVENTION

Conventional air bag modules are installed in assembly lines and at dealerships and service stations. However, the prior art air bag systems have a disadvantage in that the modules are difficult to install. Installation of the modules is difficult because it is very difficult for workers to connect the wire harness with one hand while supporting the module with the other hand. This task is made even more difficult when there is more than one wire harness to connect. Furthermore, the weight of the module, which is approximately 1.8 Kg (4 pounds), may cause the worker to accidentally drop the module while attempting to connect the harnesses.

Should the worker accidentally drop the air bag module during installation, a harness which has already been connected between the module and the steering wheel may be seriously damaged by the weight of the module. In addition, the module itself may be damaged from the fall to the floor. As a result of the above, installation of conventional air bag modules is a slow and difficult process which decreases work efficiency and which may result in damage to the harness or to the module.

This invention eliminates the above problems by improving the efficiency of air bag module installation and by preventing harnesses from being damaged by the weight of the air bag module should it be accidentally dropped during installation.

In accordance with the above, the device of this invention is an air bag system which is provided with a temporary holding means connected to the air bag module and to the steering wheel. The length of the temporary holding means is shorter than that of the harness connecting the air bag module and the steering wheel. If there is more than one harness, the temporary holding means is shorter than the shortest harness. Therefore, once this temporary means has been connected, the worker can use both hands to connect the harness. Furthermore, even if the worker accidentally drops the air bag module during installation, the weight of the air bag module will be received by the temporary holding means without causing damage to the harness.

DETAILED DESCRIPTION OF THE PREFERRED EMBODIMENT

Figure 7:
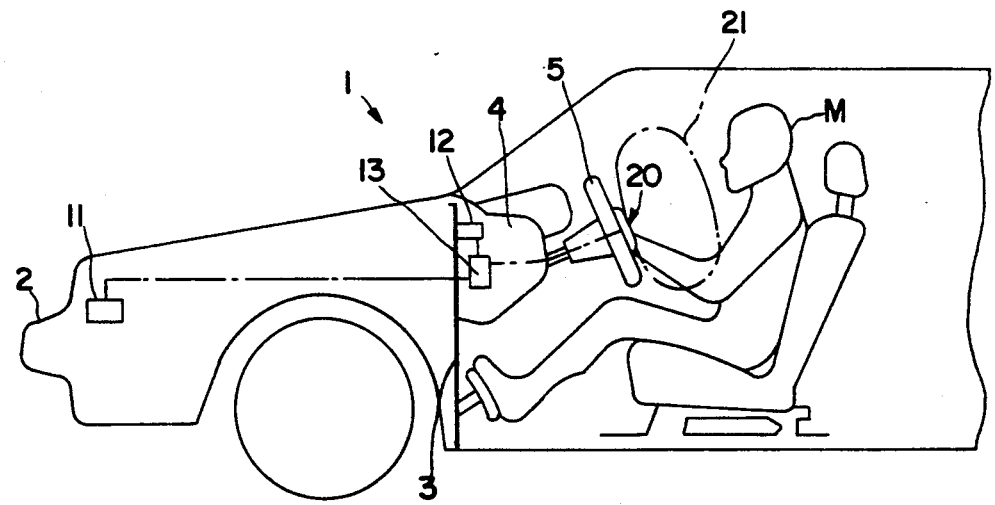
FIG. 7 is a cutaway side view of the air bag system according to a preferred embodiment of the invention.

FIG. 7 illustrates an automotive vehicle 1 which is provided with an electrically controlled air bag system. The air bag system includes a plurality of front collision sensors 11 which are located near the front bumper 2 of the vehicle, and a dash panel collision sensor 12 which is attached to the dash panel 3 at the front of the passenger compartment. The front collision sensors 11 and dash panel collision sensor 12 are electrically connected to a control unit 13 located in an instrument panel 4.

The collision sensors are gravity sensors which are well known in the art. The front collision sensors 11 are set with a relatively low sensitivity so that they turn on when the vehicle 1 is in a collision. The dash panel collision sensor 12 is set with a relatively high sensitivity so that it turns on when it detects a collision force larger than a predetermined value.

Figure 6:
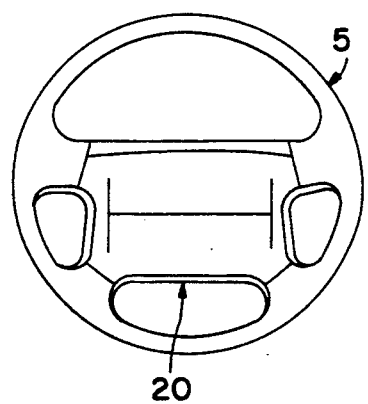
FIG. 6 is a front view of the air bag module installed on a steering wheel.

Referring to FIG. 6, a steering wheel 5 has a central portion with an air bag module 20. The air bag module 20 comprises as a unit the main components of the air bag system including the air bag, the inflator, and the ignition device. The air bag module 20 is electrically connected to the control unit 13, and the ignition device thereof is ignited in response to a command signal from the control unit 13. In accordance with the above, when the automotive vehicle 1 is in a collision, at least one of the plurality of front collision sensors 11 is turned on. If, in addition, the collision has sufficient impact to turn on a dash panel collision sensor 12, the control unit 13 sends out the signal to ignite the ignition device. The ignition device ignites the inflator, which produces a sufficient amount of gas in a short time to expand an air bag 21 toward a passenger M as shown in FIG. 7.

Figure 4:
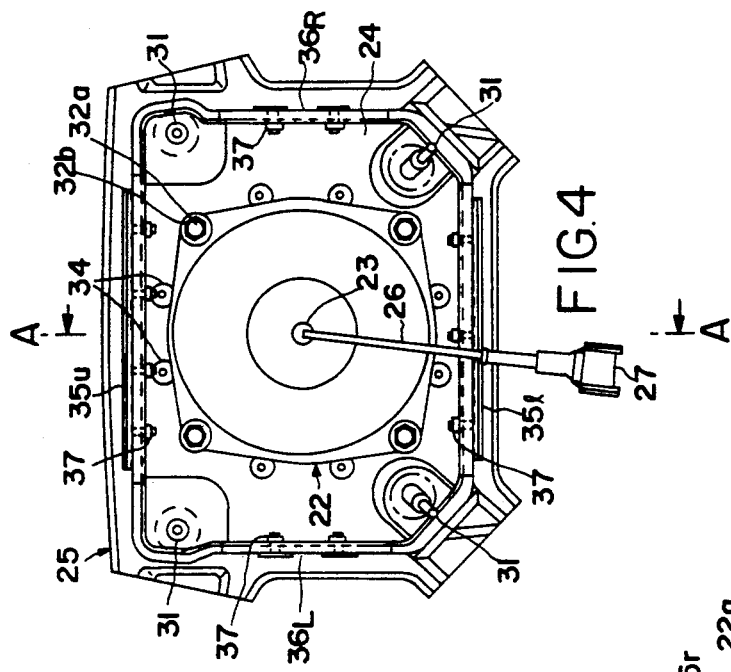
FIG. 4 is a rear view of the air bag module according to a preferred embodiment.
Figure 5:
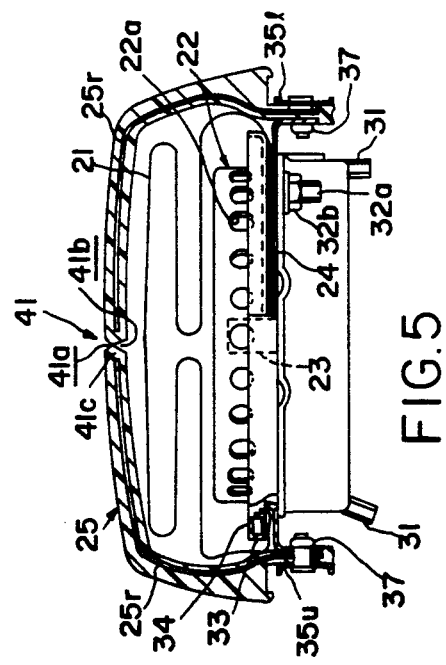
FIG. 5 is a cutaway side view of the air bag module according to a preferred embodiment.

The following is a detailed description of the air bag module 20. Referring to FIGS. 4 and 5, the air bag module 20 has an inflator 22 which produces gases in a short period of time due to the reaction of gas generation material and reaction promoting material. The air bag module 20 is also provided with ignition device 23 for igniting the inflator, and which for example generates heat by conducting electricity to cause the reaction between the gas generation material and the reaction promoting material. The air bag module 20 is further provided with an air bag 21 which expands in a very short time due to the gas generated by the inflator 22.

The air bag 21, inflator 22 and ignition device 23 are integrally assembled as a unit in the air bag module 20. Particularly, these elements are fixed on a base plate 24 and covered by a case or bag cover 25. The case 25 faces the passenger when the air bag module is installed on the steering wheel 5. The base plate 24 is provided with four bolts 31 disposed in a rectangular configuration and extending from a bottom surface thereof. The air bag module may be fixed to the steering wheel 5 by inserting the bolts 31 into corresponding holes in a central hub of the wheel.

The inflator 22 is fastened on the base plate 24 with a plurality (e.g. four sets) of bolts 32a and nuts 32b. The ignition device 23 is mounted in the center of the inflator 22. The inflator 22 has a circular side portion which forms a plurality of gas holes 22a through which generated gases are emitted into the air bag 21. The air bag 21 is folded so as to be packed into the bag cover 25 and is held about its periphery by a retainer ring 33. The retainer ring 33 is fixed to the base plate 24 by a plurality of rivets 34. The ignition device 23 is provided with an electrical harness 26 having a connector 27 disposed at a distal end thereof. The harness 26 is connected with the harness of the control unit 13 by the connector 27.

The bag cover 25 has a box-like form with a U-shaped cross section. Once the bag cover 25 has been placed on the base plate 24 so as to accommodate the inflator 22, the ignition device 23 and the air bag 21, the bag cover 25 is mounted to the base plate 24 by means of an upper reinforcement plate 35u, a lower reinforcement plate 35L, a right reinforcement plate 36R, and a left reinforcement plate 36L at the upper, lower, right and left peripheral edges thereof respectively. The reinforcement plates are fixed to the base plate by a plurality of rivets 37.

Figure 3:
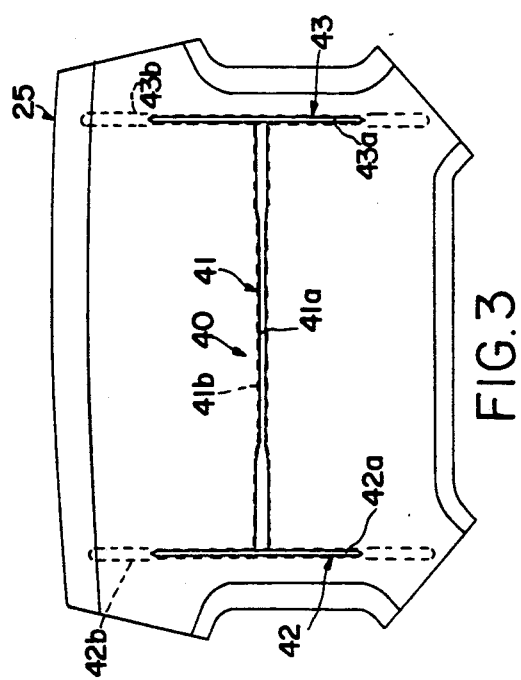
FIG. 3 is a front view of the air bag module according to a preferred embodiment.

Referring to FIG. 3, on the outside surface of the bag cover 25 are formed a transverse groove 41a, and a pair of longitudinal grooves 42a and 43a disposed at opposite ends of the transverse groove 41a. On the inside surface of the bag cover 25, a transverse groove 41b is formed under the transverse groove 41a. A pair of longitudinal grooves 42b and 43b are also formed on the inside surface of the bag cover 25 corresponding to the longitudinal grooves 42a and 43a. The grooves 41a–b, 42a–b and 43a–b together form an H-shaped groove 40.

The inside of the bag cover 25 is provided with a reinforcement material 25r such as mesh sheet made of synthetic resin (see FIG. 5). The reinforcement material 25r is disposed so as not to interfere with the groove 40. The reinforcement material 25r functions not only to hold the shape of the bag cover 25 but also to prevent the bag cover 25 from being broken into small pieces and being scattered.

When the automotive vehicle 1 is in a collision, the air bag system is actuated to expand the air bag 21. By the expansion force of the air bag 21, a thin portion 41c formed between the transverse groove 41a and 41b is broken so that the bag cover 25 is separated into upper and lower parts. The thin portion 41c is designed to be the weakest portion of the bag cover so that the explosion of the bag cover 25 initiates along the transverse groove 41 (see FIG. 5). Subsequently thin portions formed between the longitudinal groove 42a and the longitudinal groove 42b and between the longitudinal groove 43a and the longitudinal groove 43b are broken.

Because of the configuration of the H-shaped groove 40, the bag cover 25 can be unfolded not only in the up-and-down direction but also in the right-to-left direction. Therefore, the air bag 21 can expand smoothly.

The present invention further comprises a temporary holding element which connects the air bag module 20 and the steering wheel 5 so that the air bag module 20 can be held by the temporary holding element during installation of the air bag module 20 on the steering wheel 5.

Figure 1:
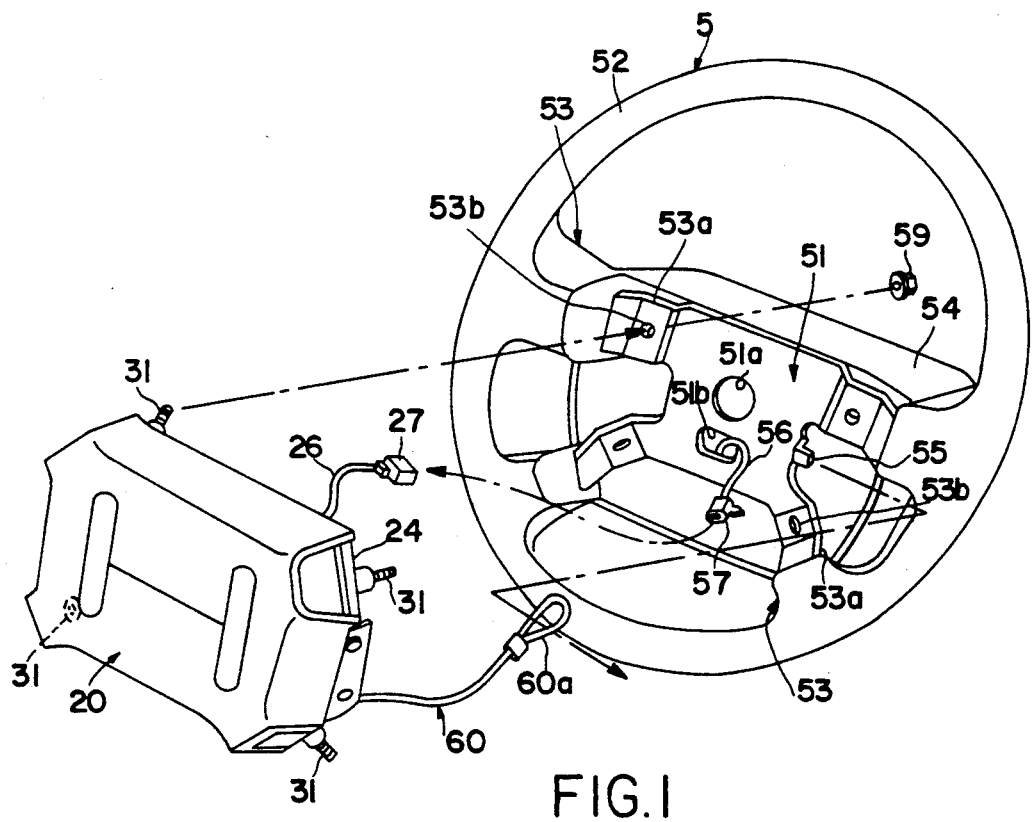
FIG. 1 is an exploded view of the air bag module according to a preferred embodiment of the invention.

Hereinafter, an installation of the air bag module 20 to the steering wheel 5 is explained in detail. Referring to FIG. 1, the steering wheel 5 has a center plate 51 which forms a central hub portion and four steering spokes 53 which connect the plate 51 to wheel ring 52. These steering spokes 53 have arm portions 53a integrally formed with the center plate 51. By connecting the arm portions 53a with a steel core (not shown) of the wheel ring 52, the center plate 51 is securely fixed to the wheel ring 52.

The center plate 51 is provided with a circular shaft hole 51a through which the head of the steering shaft (not shown) extends and a rectangular harness hole 51b through which the harness from the control unit 13 extends toward the air bag module 20. The steering shaft extends through a rear cover 54 which covers rear side of the plate 51.

The arms 53a are provided with holes 53b corresponding to the bolts of the air bag module 20. In addition, the center plate 51 is provided with a hook 55 disposed at a side portion thereof.

The base plate 24 of the air bag module 20 is provided with a connecting band 60 connected at one end thereto. The distal end of the connector band 60 is formed in a loop shape 60a which is designed to be hung on the hook 55. The wire harness 56 from the control unit 13 is fixed to the rear side of the center plate 51 and has a connector 57 at its end.

When the air bag module 20 is to be installed on the steering wheel 5, looped end 60a of the connector band 60 is first hooked on the hook 55. Subsequently, the connector 57 of the harness 56 is coupled with the connector 27 of the harness 26. Then, the bolts 31 of the air bag module 20 are inserted into the holes 53b on the arms 53a, and the installation is completed by fastening the nuts 59 on the bolts 31.

Figure 2:
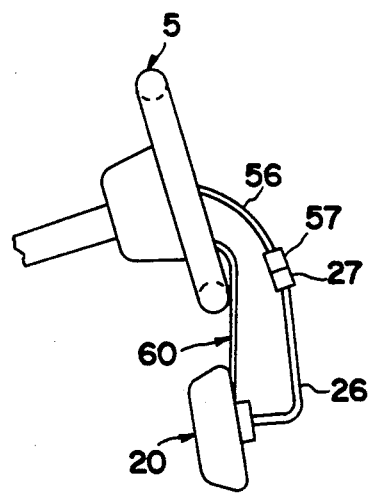
FIG. 2 is a side view of the air bag module of the invention during installation.

The connecting band 60 functions to keep a predetermined distance between the air bag module 20 and the steering wheel 5 during installation which is shorter than the length of the connected wire harness. Therefore, as shown in FIG. 2, when the worker releases the air bag module 20 from his hand during installation, the air bag module 20 is held by the connecting band 60 without damaging the harnesses 26 and 56. Accordingly, installation of the air bag module 20 becomes much easier.

In addition, since the connecting band 60 remains between the air bag module 20 and the steering wheel 5 after the installation is completed, the connecting band 60 can be used again for service work at service stations or dealerships.

Though the above embodiment is described on the basis of steering wheel wherein the central hub 51 consists of a center plate which rotates integrally with the wheel ring 52, this invention may be applied to another steering wheel wherein the center hub does not rotate and wherein the air bag module remains stationary. In such a system, the harness from the control unit can be directly connected to the harness of the air bag module without inserting a steering shaft portion. In this case, the looped end of the connecting band would be fixed to a hook somewhere on the vehicle body.

SECOND EMBODIMENT

Figure 8:
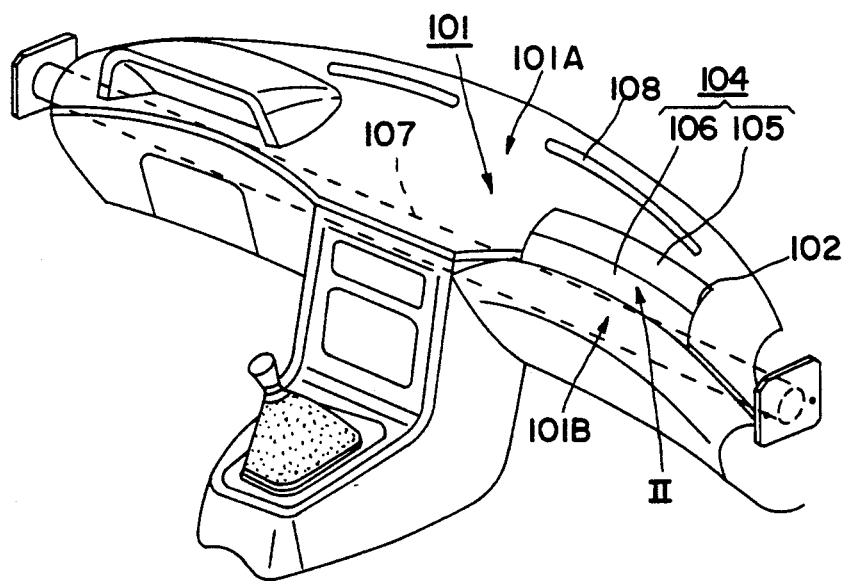
FIG. 8 is a perspective view showing a front portion of passenger compartment of a second embodiment in accordance with this invention.

FIG. 8 shows an instrument panel portion 101 of a vehicle employing the second or third embodiment of the air bag system of this invention. The instrument panel 1001 includes an upper instrument panel 101A forming an top surface and an upper front surface and a lower instrument panel 101B forming a lower front surface. The upper instrument panel 101A includes an opening 102 which is formed so as to face a passenger seated next to the driver of the vehicle.

Figure 9:
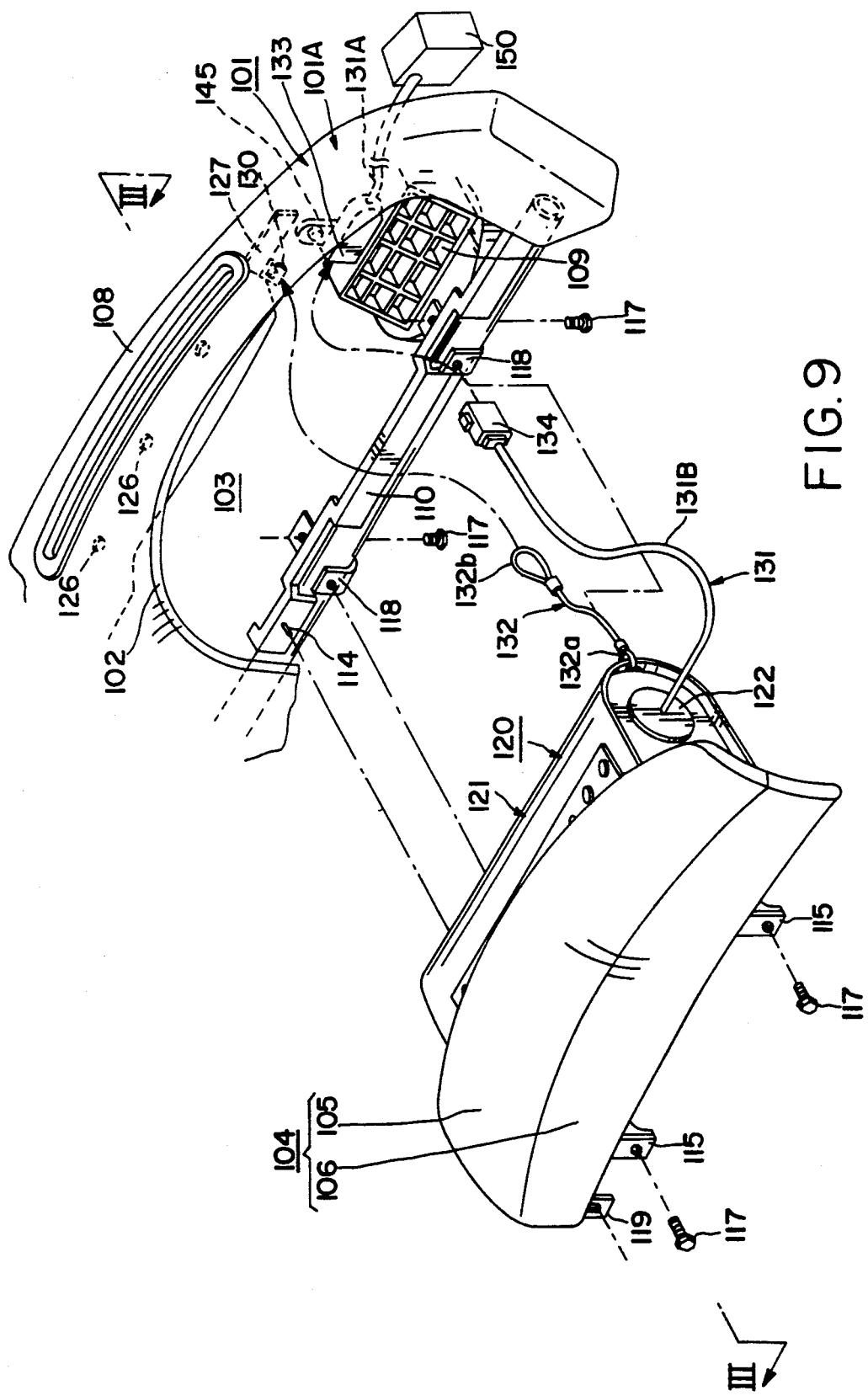
FIG. 9 is an exploded perspective view showing the portion marked II in FIG. 8.
Figure 10:
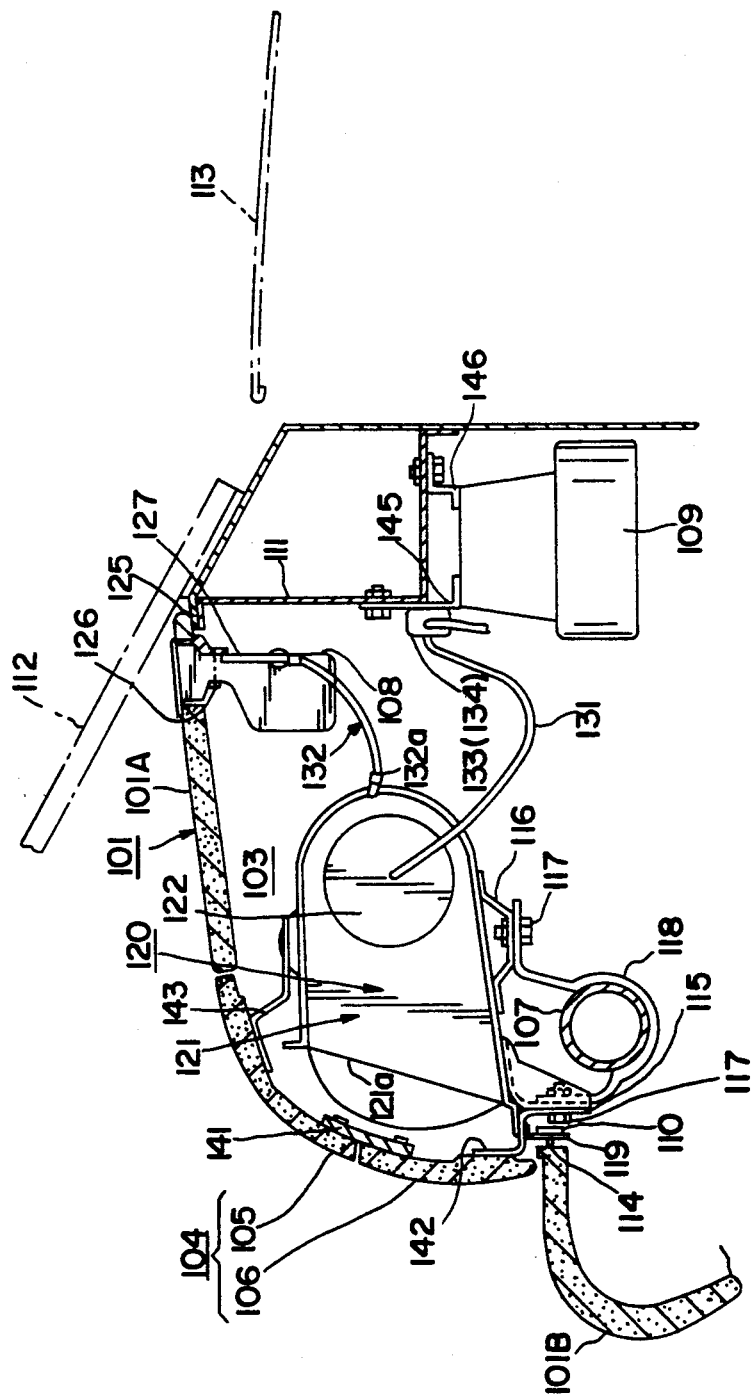
FIG. 10 is a cross sectional view taken along line III—III on FIG. 9.

Inside of the opening 102 is an inner space 103, which accommodates an air bag module 120, as shown in FIG. 9 and 10. Opening 102 is closed by an air bag lid 104 consisting of a pair of lids 105 and 106.

Hereinafter, referring to FIGS. 9 and 10, a specific structure for installing the air bag module 120 is explained in more detail. The air bag module 120 is disposed in a casing 121, the front end 121a of which is widely opened, in which an inflator 122 for generating gas, an air bag which is inflated by the gas of the inflator 122, and an ignition device for actuating the inflator 122 are accommodated together. The air bag module 120 is located so that the front end 121a faces toward the passenger seated next the driver through the opening 102. In this embodiment, a steering shaft supporting member 107 extending transversely across the instrument panel 101 and under the casing 121 is utilized to fix the air bag module 120. Since the steering shaft supporting member 107 is secured to the vehicle body at both ends, the air bag module 120 can be fixed firmly. The steering shaft member 107 has a pair of member brackets 118, 118 on it. The casing 121 has a pair of front end brackets 115, 115 which mate with the front ends of the member brackets 118, 118, respectively. Casing 121 also has a pair of lower end brackets 116, 116 which mate with the rear end of the member brackets 118, 118, respectively. These brackets 115, 115 and 118, 118 or brackets 116, 116 and 118, 118 are fastened together by bolts 117, 117.

On the steering shaft supporting member 107, an adjusting bracket 110 for adjusting position of the air bag module 120 to the instrument panel 101 is provided. The adjusting bracket 110 has a pin portion 114 protruding horizontally. The casing 121 has a locating bracket 119 provided on the lower end thereof so as to mate with pin portion 114. The casing 121 is installed automatically at its desirable position by inserting the pin portion 114 into a hole formed on the locating bracket 119.

The lid 105 and 106 constitute an upper half and a lower half of the air bag lid 104. Under normal conditions, these lids 105 and 106 are connected integrally by a connecting bar 141 so as to close the air bag lid 104, as shown in FIG. 3. However, when the air bag inflates, these lids 105 and 106 open in an up-and-down direction. The lids 105 and 106 are fixed to the casing 121 of the air bag module 120 by means of a pair of upper and lower brackets 142 and 143, respectively.

A cowl box 111 is disposed in the inner end of the inner space 103. In front of the cowl box 111, a defroster nozzle unit 108 is provided so that the below opening of the defroster nozzle unit 108 points to a glass front windshield 112. The instrument panel 101 has at its inner side an unit holding bracket 125, which holds the defroster nozzle unit 108 by means of a plurality of bolts 126, 126.

Thus defroster nozzle unit 108 also has a protrusion 127, which forms integrally with hook portion 130 the temporary holding means in accordance with this invention. A tidal end 132b of a connecting band 132, a base end 132a of which is tied to the side of the casing 121 for the air bag module 120, is hung upon the hook portion 130. Therefore, the hook portion 130 and the air bag module 120 can be combined with each other by the connecting band 132. The connecting band 132 is made of a flexible material, so it can be left in the inner space 103 without interfering with other components after the installation of the air bag module 120 is completed. Thus, the connecting band 132 is used again for service work.

On the other hand, a blower unit 109 is fixed to the bottom of the cowl box 111 through a pair of front and rear holding brackets 145 and 146. On the front holding bracket 145, a body side connector 133 is fixed. This body side connector 133 is attached at the tidal end of the body side harness 131A extending to a control unit 150 provided in the body side. A module side harness 131B is connected at its base end to the inflator 122 of the air bag module 120. At a tidal end, the module side harness 131B is connected to a module side connector 134, which is detachably coupled with the body side connector 133. The body side harness 131A and the module side harness 131B constitute a harness 131.

In accordance with this invention, the length of the connecting band 132 is designed to be short enough that the harness 131 is still loose even when the connecting band 132 is put under strain. In this embodiment, the length of the connecting band 132 is shorter than that of the module side harness 131B. By arranging the length of the connecting band 132 as described above, for example, when the air bag module 120 is removed from its installed position for repairs, the connecting band 132 can bear excessive stress caused by the weight of module 120 when accidentally dropped and completely prevent the harness 131 from being damaged by receiving such excessive stress because the harness 131 is held in a loose condition at all times by virtue of the shorter connecting band 132.

Thus, the invention results in work efficiency such that repair work is greatly improved. Furthermore, the hook portion 130 is disposed on the instrument panel 101 through the defroster nozzle unit 108. This makes it easier to get the connecting band 132 as short as possible, because the instrument panel 101 is closely located near the air bag module 120. As a result, the free fall distance of the air bag module 120 is restricted within a relatively short length by virtue of the short connecting band 132, which contributes to safety in repair work on the air bag structure.

THIRD EMBODIMENT

Figure 11:
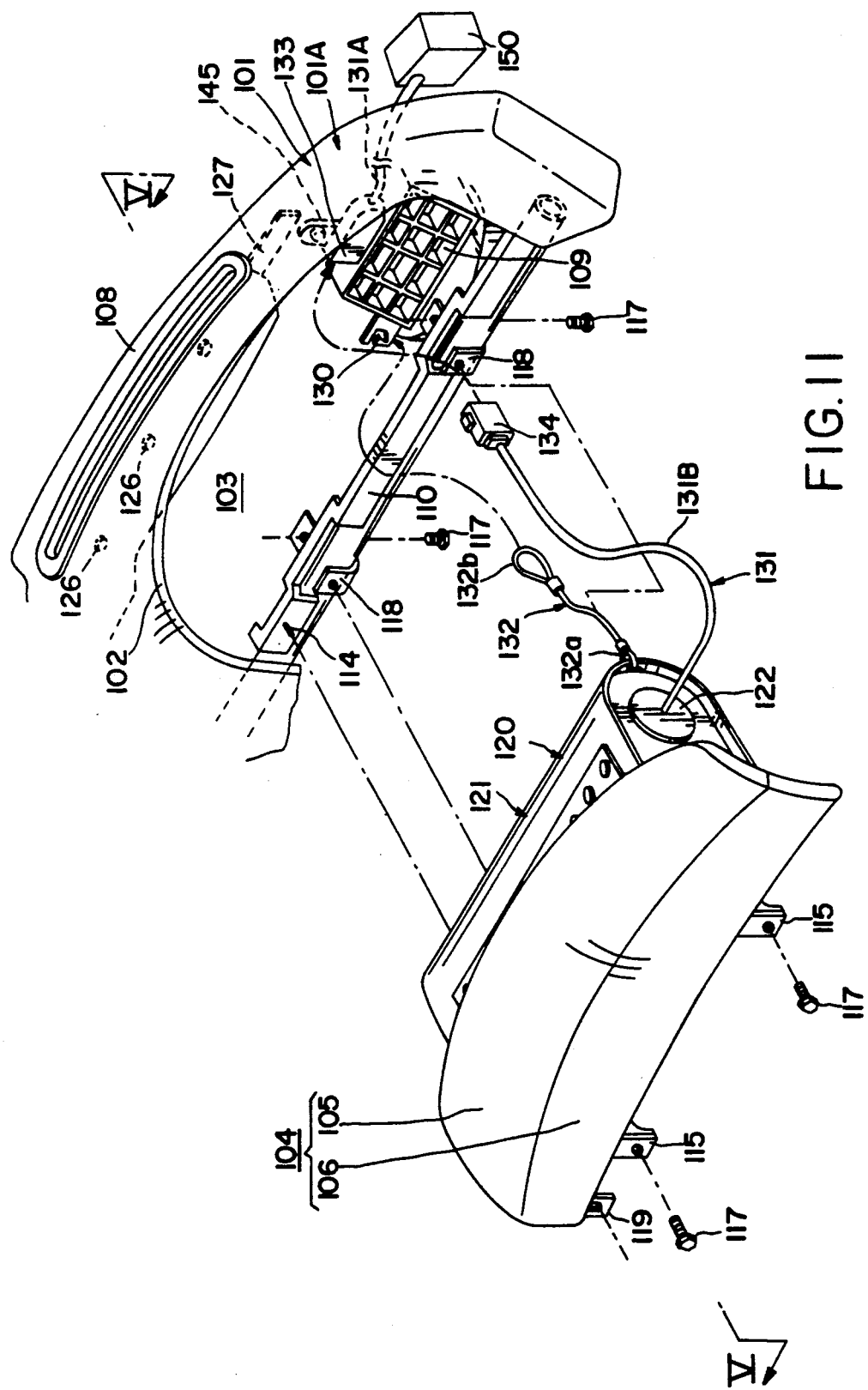
FIG. 11 is an exploded perspective view similar to FIG. 9 but showing a third embodiment in accordance with this invention.
Figure 12:
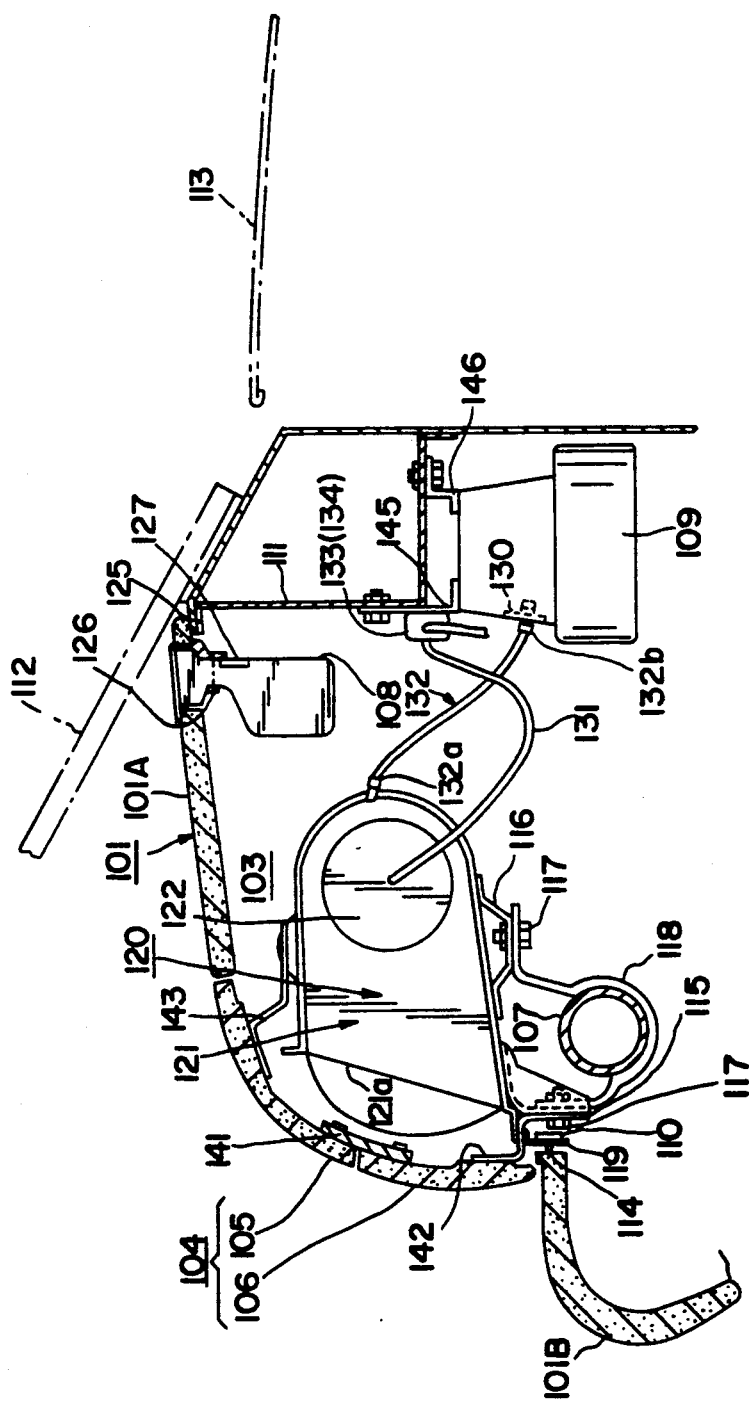
FIG. 12 is a cross sectional view taken along line V—V on FIG. 11.

FIGS. 11 and 12 show the third embodiment of the air bag system in accordance with this invention. This embodiment is the same as the second embodiment except for the position of the hook portion 130. That is, the hook portion 130 is formed on the side wall of the blower unit 109. Explanation of other components is omitted here since the remaining structure is the same as in the second embodiment.

As in the second embodiment, the length of the connecting band 132 is designed to be short enough so that the harness 131 is still loose even when the connecting band 132 is put under strain in this embodiment. The length of the connecting band 132 is also shorter than that of the module side harness 131B.

By arranging the length of the connecting band 132 as described above, as well as in the second embodiment, when the air bag module 120 is accidentally dropped, the connecting band 132 can bear excessive stress caused by the weight of module 120 when accidentally dropped and completely prevent the harness 131 from being damaged by receiving such excessive stress because the harness 131 is held in a loose condition at all times by virtue of the shorter connecting band 132. Thus, the efficiency of such repair work can be greatly improved. In addition, the hook portion 130 in this embodiment can be connected rigidly to the body since the blower 109 is fixed even more firmly to the cowl panel 111, i.e., the body member, than the instrument panel 101. Therefore, the hook 130 can support the module 120 securely when it is dropped.

While there is shown and described present embodiments of the invention, it is to be distinctly understood that the invention is not limited thereto, but may be otherwise variously embodied and practiced within the scope of the following claims.

What is claimed is:

1. Air bag system for preventing injuries to passengers in a passenger compartment of an automotive vehicle, said air bag system comprising:
   an air bag module mounted on a steering wheel which faces a passenger in the passenger compartment;
   control means mounted to the body of the automotive vehicle for controlling the air bag module;
   at least one first electrical harness section extending from the control means and having a connecting means disposed at a distal end thereof, wherein said at least one first electrical harness section has a middle portion which extends through the steering wheel; and
   temporary holding means for connecting the air bag module detachably to a fastening element provided in the steering wheel.

2. Air bag system as claimed in claim 1, further comprising
   at least one second electrical harness section extending from the air bag module and having a complementary connecting means disposed at a distal end thereof, wherein said complementary connecting means is electrically engageable with said connecting means; and
   wherein said temporary holding means is shorter in length than a combined length of said second electrical harness section and the portion of the first electrical harness section between the middle portion and the distal end thereof.

3. Air bag system as claimed in claim 2, wherein said steering wheel is provided with fastening means, and wherein said temporary holding means comprises a connecting band which is fixedly attached at one end thereof to the air bag module and which is provided with a complementary fastening means at the other end thereof for removably fastening said connecting band to the fastening means.

4. Air bag system as claimed in claim 3, wherein said fastening means comprises a hook and wherein said complementary fastening means comprises a looped end of the connecting band.

5. Air bag system as claimed in claim 2, comprising a plurality of first electrical harness sections of differing lengths and a plurality of second electrical harness sections of differing lengths, wherein said temporary holding means is shorter in length than the shortest said combined length.

6. An air bag system as claimed in claim 1, wherein said temporary holding means is fixedly attached at one end to the air bag module.

7. Air bag system for preventing injuries to passengers in a passenger compartment of an automotive vehicle, said air bag system comprising:
   an air bag module located to face a passenger in the passenger compartment;
   control means mounted to the body of the automotive vehicle for controlling the air bag module;
   harness means for transmitting signals for controlling the module, said harness means being connected at one end to the air bag module and at its other end to the control means; and
   temporary holding means for connecting the air bag module detachably to a hook element provided in the passenger compartment;
   wherein the length of said temporary holding means is short enough so that the harness means is still loose even when the temporary holding means is put under strain.

8. An air bag system as claimed in claim 7, wherein said air bag module is located in an instrument panel provided in the passenger compartment.

9. An air bag system as claimed in claim 7, wherein said air bag module faces a passenger seated next to a driver.

10. An air bag system as claimed in claim 7, wherein said hook element comprises a member provided on an instrument panel in the passenger compartment.

11. An air bag system as claimed in claim 7, wherein said hook element comprises a member provided on the body member of the automotive vehicle.

12. Method of installing an air bag module for an air bag system on a steering wheel of an automotive vehicle, comprising the steps of:
   a) fastening a temporary holding means between the air bag module and the steering wheel;
   b) fastening at least one electrical harness between the air bag module and the steering wheel; and
   c) mounting the air bag module to the steering wheel.

13. The method of claim 12, wherein step a) proceeds step b) which in turn proceeds step c).

14. Method of installing an air bag module as claimed in claim 12, wherein step a) comprises the step of fastening a looped end of the temporary holding means to a hook provided on the steering wheel.

15. An air bag system for preventing injuries to passengers in a passenger compartment of an automotive vehicle, said air bag system comprising:
   a first air bag module located to face a driver in the passenger compartment;
   a second air bag module located to face a passenger seated next to the driver in the passenger compartment;

first control means mounted to the body of the automotive vehicle for controlling the first air bag module;

second control means mounted to the body of the automotive vehicle for controlling the second air bag module;

first harness means for transmitting signals for controlling the first air bag module, said first harness means being connected at one end t the first air bag module and at its other end to the first control means; and second harness means for transmitting signals for controlling the second air bag module, said second harness means being connected at one end to the second air bag module and at its other end to the second control means;

first temporary holding means for connecting the first air bag module means detachably to a first fastening element provided in the steering wheel; and second temporary holding means for connecting the second air bag module means detachably to a second fastening element provided in an instrument panel.

16. An air bag system as claimed in claim 15, wherein said first temporary holding means is short enough so that the first harness means is still loose even when the first temporary holding means is put under strain and the length of said second temporary holding means is short enough so that the second harness means is still loose even when the second temporary holding means is put under strain.

17. A method of installing a first air bag module on a steering wheel of an automotive vehicle and installing a second air bag module in an instrument panel of the automotive vehicle, comprising the steps of:
 a) fastening a first temporary holding means between the first air bag module and the steering wheel;
 b) fastening a first electrical harness means between the first air bag module and the steering wheel;
 c) mounting the first air bag module to the steering wheel;
 d) fastening a second temporary holding means between the second air bag module and the instrument panel;
 e) fastening a second electrical harness means between the second air bag module and the instrument panel; and
 f) mounting the second air bag module to the instrument panel;

18. A method of installing an air bag module in an instrument panel of an automotive vehicle, comprising the steps of:
 a) fastening a temporary holding means between the air bag module and the instrument panel;
 b) fastening an electrical harness means between the air bag module and the instrument panel; and
 c) mounting the air bag module to the instrument panel.

19. The method of installing as claimed in claim 18, wherein step a) comprises the step of fastening a looped end of the temporary holding means to a hook provided on the instrument panel.

20. The method of installing as claimed in claim 19, wherein the hook is provided on a defroster nozzle unit in the instrument panel.

21. The method of installing as claimed in claim 19, wherein the hook is provided on a blower unit in the instrument panel.

22. An air bag module for attachment to at least one of a steering wheel and an instrument panel in a passenger compartment of an automotive vehicle, said air bag module comprising:
 an air bag;
 an inflator;
 an ignition device; and
 harness means capable of transmitting signals for controlling the module, said harness means being connected at one end to the air bag module; and
 temporary holding means for connecting the air bag module detachably to a fastening element provided in the passenger compartment.

* * * * *